(12) United States Patent
Merensky

(10) Patent No.: US 8,028,630 B2
(45) Date of Patent: Oct. 4, 2011

(54) FOLDING TABLE ARRANGEMENT

(75) Inventor: Harald Merensky, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 460 days.

(21) Appl. No.: 11/898,365

(22) Filed: Sep. 11, 2007

(65) Prior Publication Data

US 2008/0092784 A1    Apr. 24, 2008

(30) Foreign Application Priority Data

Sep. 21, 2006  (EP) ..................................... 06019820

(51) Int. Cl.
    *A47B 3/00*  (2006.01)
(52) U.S. Cl. .......................................... 108/36; 297/147
(58) Field of Classification Search .................. 108/44, 108/47, 48, 40, 35, 36, 147.11; 297/145, 297/147, 155, 158.2
    See application file for complete search history.

(56) References Cited

U.S. PATENT DOCUMENTS

| | | | | |
|---|---|---|---|---|
| 2,251,544 A | * | 8/1941 | Jiranek | 297/145 |
| 2,845,113 A | * | 7/1958 | Keel | 297/145 |
| 3,583,760 A | * | 6/1971 | McGregor | 297/145 |
| 4,681,381 A | * | 7/1987 | Sevey | 312/333 |
| 4,834,449 A | * | 5/1989 | Engelman | 297/145 |
| 4,944,552 A | * | 7/1990 | Harris | 297/145 |
| 5,893,615 A | * | 4/1999 | Hendricks | 312/71 |
| 2001/0000639 A1 | | 5/2001 | Park et al. | |

FOREIGN PATENT DOCUMENTS

| | | |
|---|---|---|
| EP | 0 621 174 | 10/1994 |
| EP | 1 172 252 | 1/2002 |
| EP | 1 449 709 | 8/2004 |
| FR | 2 841 510 | 1/2004 |

OTHER PUBLICATIONS

European Search Report dated Jan. 23, 2007, directed to counterpart EP application No. 06019820.7 (5 pages).

* cited by examiner

*Primary Examiner* — Darnell Jayne
*Assistant Examiner* — Matthew Ing
(74) *Attorney, Agent, or Firm* — Morrison & Foerster LLP

(57) ABSTRACT

A folding-table arrangement includes a supporting device, a table housing accommodating a table top in an essentially vertical stowed position and a table top which can be adjusted from an essentially vertical stowed position in the table housing into an essentially horizontal use position. The table housing is arranged in a height-adjustable manner on the supporting device and, in the use position, the table top has its underside supported on the table housing.

10 Claims, 4 Drawing Sheets

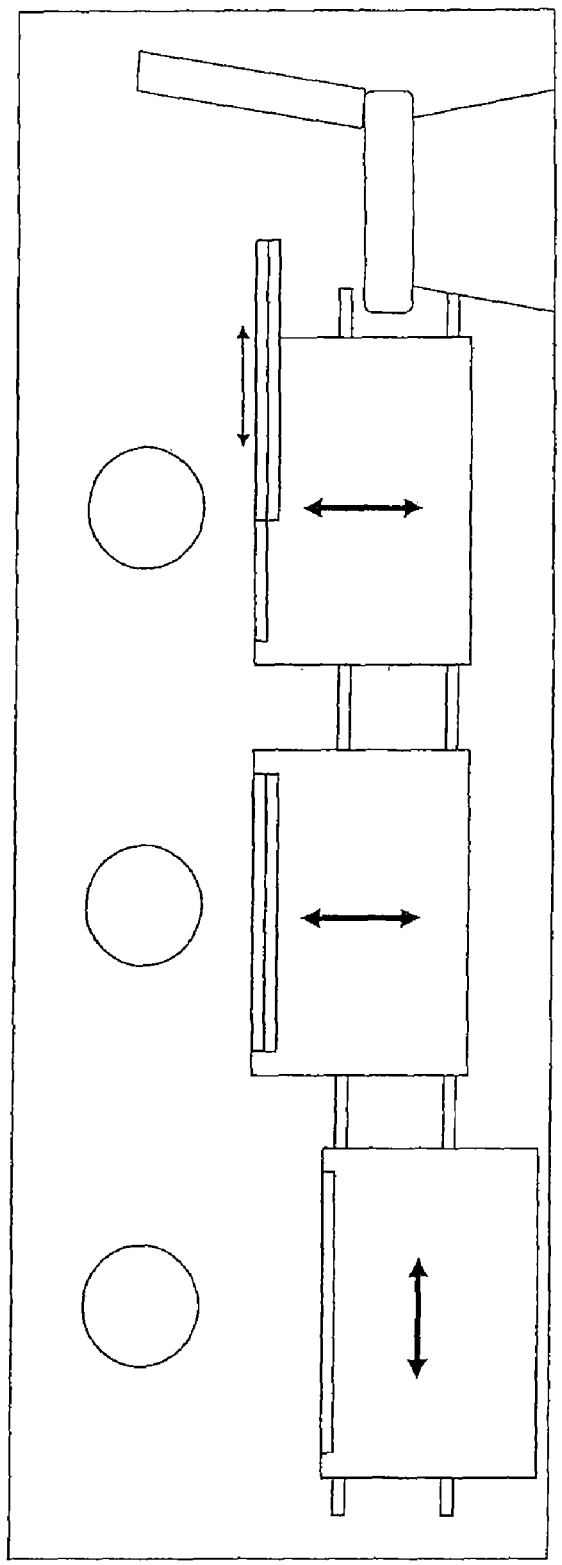

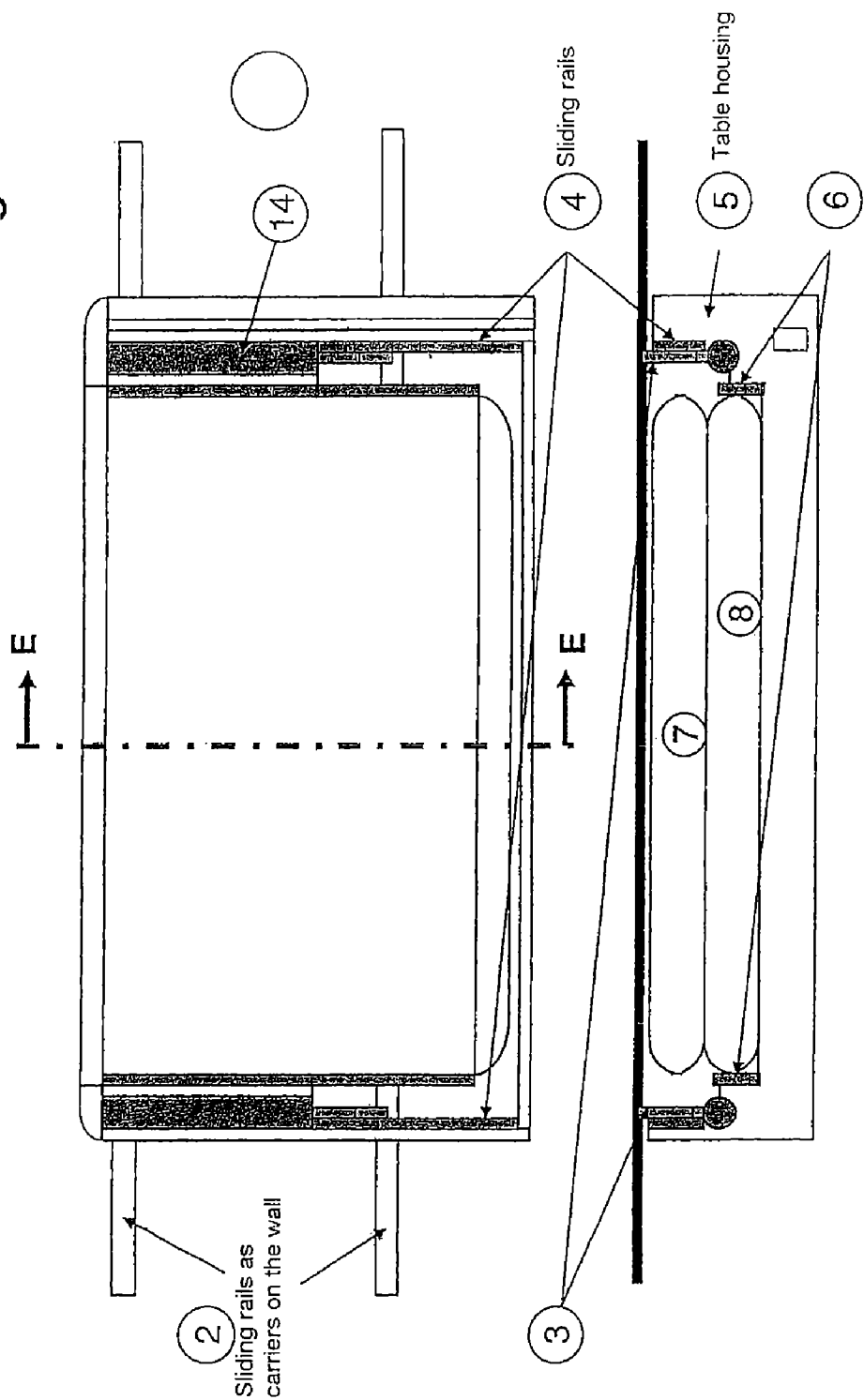

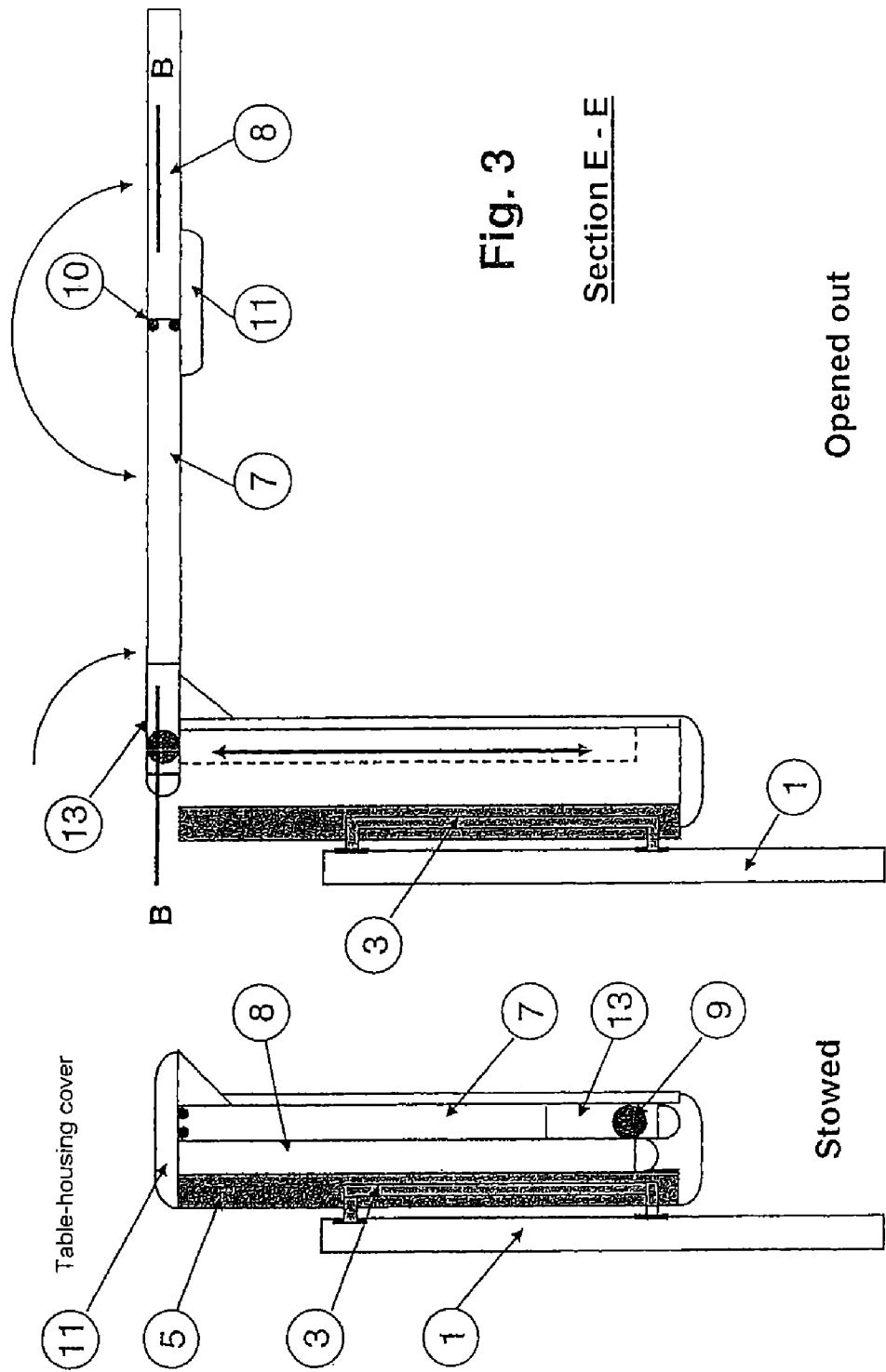

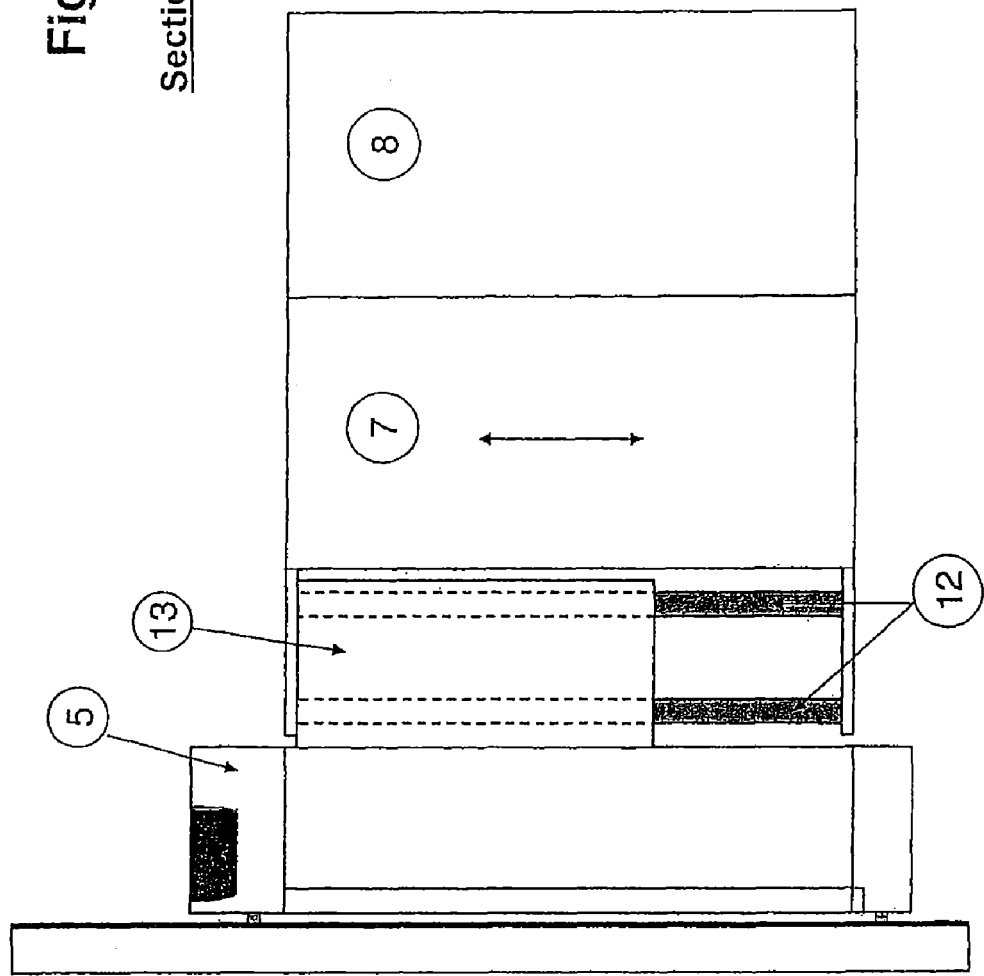

FOLDING TABLE ARRANGEMENT

REFERENCE TO RELATED APPLICATION

This application claims the Paris Convention priority of European Application No. 06 019820.7, filed Sep. 21, 2007, the entire contents of which are incorporated herein by reference.

FIELD OF THE INVENTION

The invention relates to a folding-table arrangement.

BACKGROUND OF THE INVENTION

Folding-table arrangements are widely used, in particular in means of transport, for example aircraft. They have a so-called folding table which can be adjusted from a use position into a stowed position, in which it can be removed from the immediate area of movement of the user, for example during takeoff and landing of an aircraft.

In particular in the first-class or business-class compartments of commercial long-haul aircraft, the distance between seats is usually such that folding tables for use by a passenger cannot be fitted in the backrest of the seat in front, as is known from the conventional seat arrangements in economy class. Instead, such a folding table has to be fitted laterally in front of the passenger seat, in a wall, a partition or a piece of furniture usually referred to as a credenza.

SUMMARY OF THE INVENTION

The object of the invention is to provide a versatile folding-table arrangement which the passenger can handle easily.

The folding-table arrangement according to the invention has the following features:
 a) a supporting device,
 b) a table housing for accommodating a table top in an essentially vertical stowed position,
 c) the table housing is arranged in a height-adjustable manner on the supporting device,
 d) a table top, which can be adjusted from an essentially vertical stowed position in the table housing into an essentially horizontal use position,
 e) in the use position, the table top has its underside supported on the table housing.

First of all, let's explain some of the terms used within the context of the invention.

The term supporting device refers to any device on which the table can be fitted and which absorbs and dissipates the forces acting on the table. The supporting device may be designed, in particular, as an essentially vertical wall, for example the inner wall of an aircraft, a partition between two passenger seats, the wall of a piece of furniture, for example a so-called credenza, or the like.

A table housing as arranged in a height-adjustable manner on the supporting device. Height-adjustable means that the vertical height of the table housing relative to the supporting device can easily be changed by a user without any tools being required.

The table housing serves for accommodating a table top in an essentially vertical stowed position. In this vertical stowed position, the table top is preferably arranged essentially parallel to the wall of the supporting device. The term table housing is to be understood on a functional basis and refers to a device which, on the one hand, is arranged in a height-adjustable manner on the supporting device and, on the other hand, accommodates, and bears, the table top. The table housing preferably encloses the table top at least partially, preferably particularly fully, in the stowed state.

The table top can be adjusted from the essentially vertical stowed position in the table housing into an essentially horizontal use position. It can preferably be pulled out of the table housing in the upward direction and then pivoted into the horizontal use position. In the use position, the table top has its underside supported on the table housing. This means that the forces acting on the table top in the use position, in the first instance, are dissipated into the table housing and, from there, are transferred onto the supporting device.

It is a basic idea of the invention for the mechanisms for pulling the table top out of the table housing and pivoting it into the use position, on the one hand, and for adjusting the height of the table, on the other hand, to be separated from one another in that the table housing as a whole can be height-adjusted on the supporting device. The table housing, on the one hand, accommodates the table top in the stowed position and, on the other hand, it bears it in the use position. It is preferably the case that the table top is otherwise self-supporting, that is to say it dissipates into the table housing all the forces acting on it.

A particular advantage of the invention is that the height-adjustment capability of the table housing on the supporting device may be such that the top edge of the table housing (and thus also the table top in the use state) is located above the top edge of the supporting device (for example a credenza on a commercial aircraft). The height of the credenza on a commercial aircraft is usually lower than, or at most exactly level with, the height of the armrests of the seat. Using a table housing which can be adjusted in height above this level, it is also possible for the table (the table top) to be arranged above the top edge of the credenza in the use state.

In the case of a particularly preferred embodiment, the folding-table arrangement has, in addition, at least one table-housing carrier, which is arranged such that it can be displaced essentially horizontally on the supporting device, the table housing then being arranged in a height-adjustable manner on the table-housing carrier.

In the case of this embodiment of the invention, the table housing is mechanically coupled to the supporting device not directly, but via at least one separate table-housing carrier (preferably two such carriers), and these allow, in addition, the entire table housing to be adjusted in the horizontal direction.

For this purpose, the table-housing carrier or carriers is or are preferably arranged such that it or they can be displaced essentially horizontally on sliding rails on the supporting device. Locking means may be provided for fixing the horizontal position of the table-housing carriers relative to the supporting device.

The height adjustment of the table housing relative to the table-housing carrier and/or the supporting device may likewise take place by means of sliding rails.

The height adjustment of the table housing is preferably assisted by external force. This means that the external force assists in raising the table housing counter to gravitational force. The external force may be generated mechanically or electrically. The external force is preferably generated by a prestressed spring element, for example one or more pneumatic compression springs.

The height adjustment of the table housing preferably has a locking means for fixing the table housing at least two different heights.

The table housing preferably has a top opening, out of which the folding table can be pulled in the upward direction.

Once it has been pulled out completely, it can be pivoted into the use position. It is retained in the use position, on the one hand, by being fixed on the pivot pin and, on the other hand, by resting on the top edge of the table housing.

The table top preferably has at least two table-top parts which can be swung together. The two table-top parts are preferably connected to one another by a hinge. In the stowed position, they are positioned in the swung-together state in the table housing; in the use position, in the opened-out state, they can enlarge the table width.

Two table-top parts, in the use state, are preferably supported along their abutment edge by a supporting element. This supporting element is arranged beneath this abutment edge in the use state; in the stowed state, it can close off the table housing in the upward direction as a cover.

In addition to the horizontal displaceability of the table housing/table-housing carrier as a whole, it is possible for the folding table itself, in the use position, to be displaced horizontally relative to the table housing. For this purpose, it may be arranged, for example, on telescopic rods.

BRIEF DESCRIPTION OF THE DRAWINGS

An exemplary embodiment of the invention is described hereinbelow with reference to the drawing, in which:

FIG. 1 shows, schematically, the folding-table arrangement according to the invention in different positions;

FIG. 2 shows, schematically, a horizontal section and a vertical section through the table housing;

FIG. 3 shows, in a vertical section, the arrangement according to the invention in the stowed state and the use state; and FIG. 4 shows a plan view of the arrangement according to the invention in the use state.

DETAILED DESCRIPTION OF THE INVENTION

Two horizontally running sliding rails 2 are arranged on a supporting device (the wall 1 of a credenza, see FIG. 3). Two table-housing carriers 3 are arranged such that they can be displaced horizontally in the sliding rails. The table-housing carriers 3, in turn, interact with sliding rails 4 (illustrated schematically in FIG. 2) on the inside of the table housing 5. In this way, the table housing 5 can be displaced vertically relative to the table-housing carriers 3.

In the table housing 5, a table is arranged such that it can be displaced on sliding rails 6 (see FIG. 2). This table has two table-top elements 7, 8 which can be swung together. The table-top element 7 has a pivot pin 9, which is indicated in FIG. 3, and the ends of this pivot pin 9 run in a displaceable manner in the sliding rails 6.

The two table tops 7, 8 are connected to one another via a hinge, which is indicated at 10. A supporting element 11 is likewise fastened on the hinge. In the use state, the supporting element 11 supports the two table-top halves 7, 8 along their joints connected by the hinge 10, and thus increases the stability of the table in the use state. In the stowed state, the supporting element 11 closes off the table housing 5 in the upward direction as a cover.

It can be seen in FIG. 4 that the two table-top halves 7, 8 have telescopic rails 12 by means of which they can be displaced, once again, horizontally relative to the table housing 5. Provided for this purpose is a further, shortened table element 13, relative to which the two table-top halves 7, 8 can be displaced on the telescopic rails 12.

The folding-table arrangement according to the invention is used as follows.

In the first instance, the arrangement is in the stowed state. If the table is to be used, (for example once the cruising altitude of the aircraft has been reached), the passenger can displace this table into the desired horizontal position, first of all, by displacing the table housing 5 by way of the table-housing carriers 3 in the sliding rails 2.

The table housing 5 is then set to the desired vertical height relative to the table-housing carriers 3 by virtue of the latter being displaced in the sliding rails 4. Pneumatic compression springs 14, which are illustrated schematically in FIG. 2, can assist this operation by applying a force which opposes the weight of the table housing with the table arranged thereon.

The table housing 5 can be fixed at the desired height by fixing means (not illustrated in the drawing). For example, for this purpose, a locking pin can engage in a perforated strip.

The table is then gripped from above and pulled out of the table housing 5. In this case, the corresponding end regions of the pivot pin 9 slide in the sliding rails 6 of the table housing 5.

As soon as the pivot pin 9 has reached the top end stop in the sliding rails 6, the table can be pivoted about this pivot pin 9 into the horizontal use position. The table-top half 8 can then be swung over, about the hinge 10, in relation to the table-top half 7. The user can then also displace the two table-top halves 7, 8 further in the horizontal direction in relation to the table housing 5 on the telescopic rails 12. The operation of stowing the folding-table arrangement according to the invention back into the stowed position takes place in reverse sequence.

The invention claimed is:

1. A folding-table arrangement, comprising:
   a supporting device,
   a table housing movably connected to the supporting device, wherein the table housing is movable in a substantially vertical direction relative to the supporting device,
   a table top movably connected to the table housing, wherein the table top is movable from a substantially vertical stowed position in the table housing to a substantially horizontal use position, at least one table-housing carrier interconnecting the table housing and the supporting device, wherein the table-housing carrier is movably connected to the supporting device, wherein the table-housing carrier is movable in a substantially horizontal direction relative to the supporting device, and wherein the table housing is movably connected to the table-housing carrier, wherein the table housing is movable in a substantially vertical direction relative to the table-housing carrier,
   wherein the table housing is configured to support an underside of the table top in the use position.

2. The folding-table arrangement of claim 1, wherein a top edge of the table housing is movable beyond a top edge of the supporting device.

3. The folding-table arrangement of claim 1, wherein the table-housing carrier is movably connected to sliding rails on the supporting device.

4. The folding-table arrangement of claim 1, wherein the table housing is movably connected to the supporting device or the table-housing carrier, wherein the table housing is movable in a substantially vertical direction relative to the supporting device or the table-housing carrier, by sliding rails.

5. The folding-table arrangement of claim 1, further comprising a device providing external force to the table housing, wherein the external force is provided in the substantially vertical direction.

6. The folding-table arrangement of claim 5, wherein the device comprises a spring element.

7. The folding-table arrangement of claim 1, wherein the table top is configured to move in an upward direction relative to the table housing from the stowed position to an intermediate position, and wherein the table top is configured to pivot from the intermediate position into the use position.

8. The folding-table arrangement of claim 7, wherein the table top comprises two table-top parts configured to be swung together.

9. The folding-table arrangement of claim 8, further comprising a supporting element configured to close off a top of the table housing when the table top is in the stowed position and to support the table-top parts along abutment edges of the table-top parts when the table top is in the use position.

10. The folding-table arrangement of claim 1, wherein the table top, in the use position, is movably connected to the table housing, wherein the table top is movable in a substantially horizontal direction relative to the table housing.

\* \* \* \* \*

UNITED STATES PATENT AND TRADEMARK OFFICE
CERTIFICATE OF CORRECTION

| | | |
|---|---|---|
| PATENT NO. | : 8,028,630 B2 | Page 1 of 1 |
| APPLICATION NO. | : 11/898365 | |
| DATED | : October 4, 2011 | |
| INVENTOR(S) | : Harald Merensky | |

It is certified that error appears in the above-identified patent and that said Letters Patent is hereby corrected as shown below:

In the Specification:

At column 1, line number 6, please replace "Sept. 21, 2007" with --Sept. 21, 2006--.

Signed and Sealed this
Sixth Day of December, 2011

David J. Kappos
*Director of the United States Patent and Trademark Office*